No. 754,534. Patented March 15, 1904.

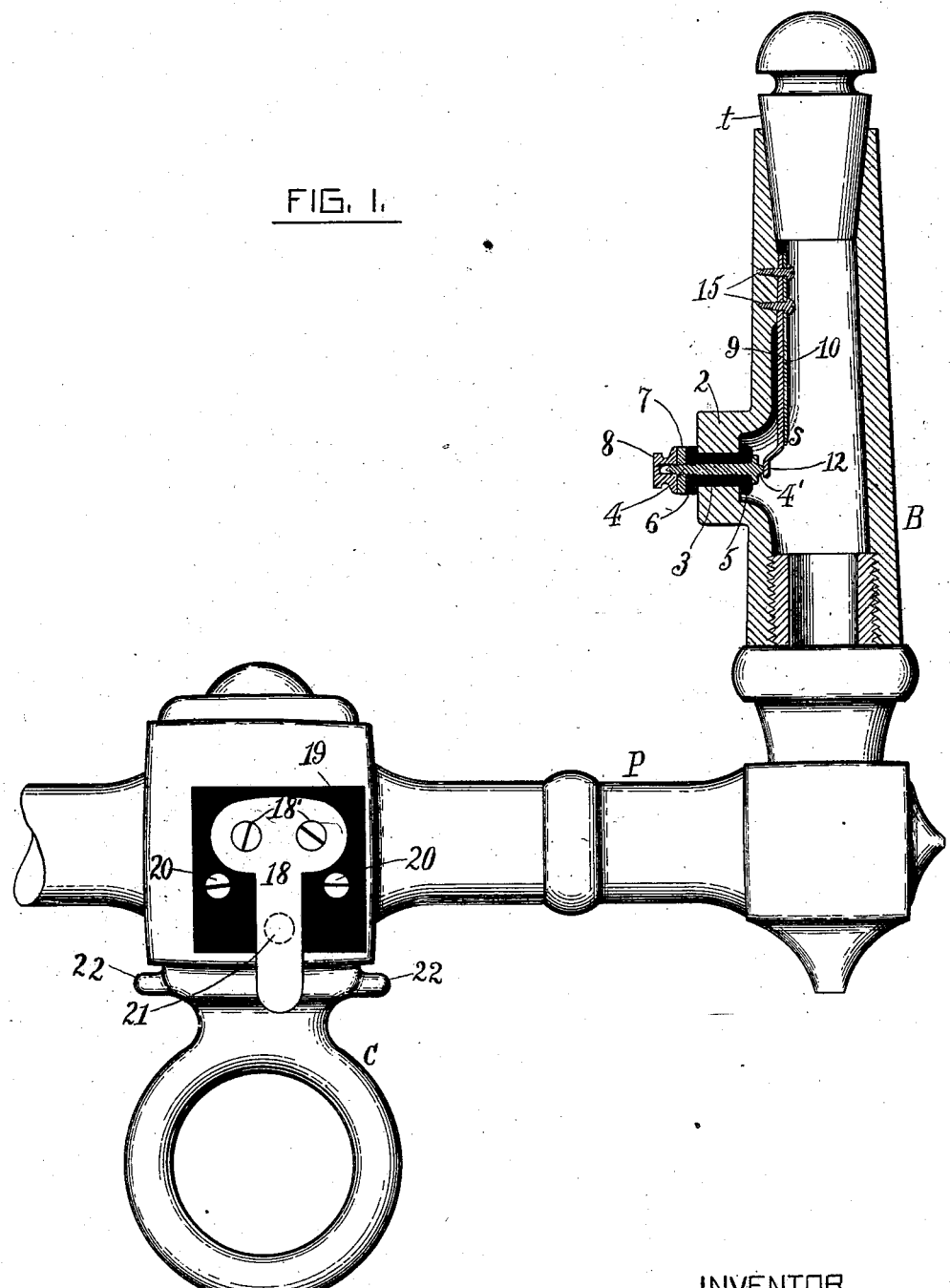

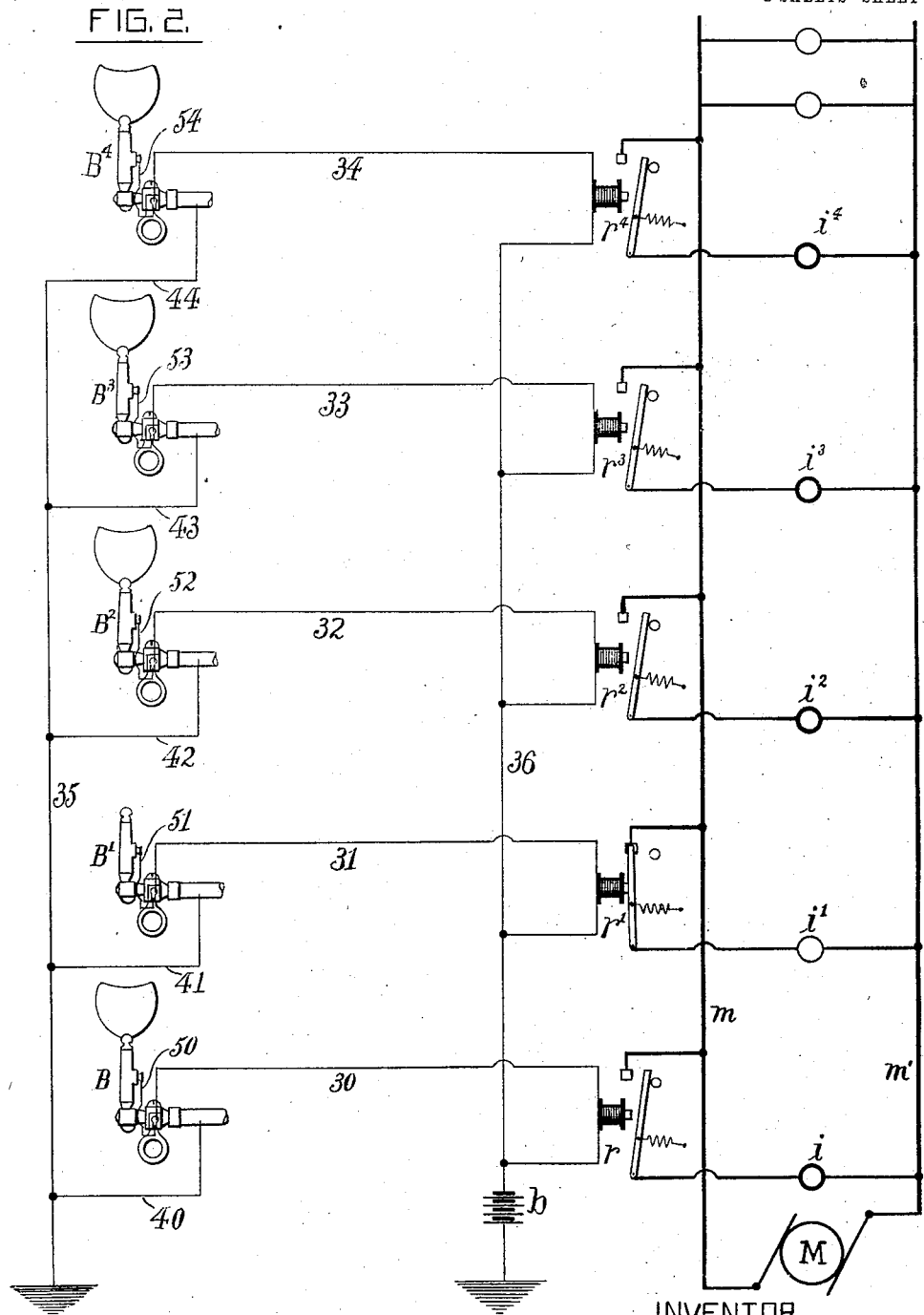

UNITED STATES PATENT OFFICE.

JAMES EDWARD BALDWIN, OF EAST WILLISTON, NEW YORK.

THERMOSTATIC GAS-DETECTING MEANS.

SPECIFICATION forming part of Letters Patent No. 754,534, dated March 15, 1904.

Application filed September 10, 1902. Serial No. 122,836. (No model.)

*To all whom it may concern:*

Be it known that I, JAMES EDWARD BALDWIN, a citizen of the United States, and a resident of East Williston, in the county of Nassau and State of New York, have invented certain new and useful Improvements in Thermostatic Gas-Detecting Means, of which the following is a specification.

This invention relates to thermostatic gas-detecting means for indicating the escape of unburned gas from a burner; and its main object is to provide a device of this type in which the difference in temperature at the burner, according as the gas is lighted or unlighted, is utilized to operate an indicator and show whether the gas is being burned as it flows out or is escaping unconsumed.

In carrying my invention into effect any suitable device responsive to the difference in temperature between a lighted and an unlighted burner may be employed as the principal controlling element, and it is immaterial what physical or other property of this element is responsive to such a difference in temperature, provided that some property or characteristic possessed by it is sensibly affected and is responsive to such a difference in temperature at the burner. This element may be, for example, an element of an electric circuit and may have a resistance variable in accordance with such a change in temperature, and this variation in resistance may be employed to indicate the lighted or unlighted condition of the burner, or said controlling element may be a thermostatic switch controlling an electric circuit and adapted to change its position in accordance with such a change in temperature, and this is the means employed in the present case for transmitting indications of the condition of the burner, although other similar devices which will suggest themselves may be employed for the same purpose.

My invention is specially designed and intended for use in hotels and similar large buildings having many sleeping apartments to indicate not only the escape of unconsumed gas from some one of the burners in the building, but also the particular apartment in which such gas is escaping from a burner, and in the event that the gas is put out or blown out by accident or design such fact will be signaled almost immediately to an indicator located at a suitable point, and the rescue of any person or persons in such apartment may be effected before asphyxiation results.

In the drawings accompanying this specification and forming part of the present application, Figure 1 is an enlarged sectional side elevation of a gas-burner and a gas-controlling valve having my invention applied thereto. Fig. 2 is a diagrammatic view of a system including a series of gas-burners protected by my improved thermostatic controlling device.

Similar characters designate like parts in both figures of the drawings.

The controlling means employed by me may be applied to any ordinary or suitable form of gas-burner; but in the present drawings I have shown a type of burner ordinarily attached to the piping of an illuminating-gas system. As shown, a burner, such as B, is screwed onto the end of a section of pipe in the usual manner, and a controlling valve or cock, such as C, is also applied to the piping substantially in the usual way.

My improved controlling device, which is intended to respond to difference in temperature between a lighted and an unlighted burner, is preferably applied directly to the body portion or pillar of the burner B, which pillar is closed at its upper end by a tip $t$ of any suitable type. In the present case the burner-pillar has at one side thereof a projecting piece 2, which is bored transversely to the pillar to receive certain elements of the controlling device. One of these elements is a short insulating sleeve or bushing, (designated by 3,) through which is passed a metallic member, preferably in the form of a binding-screw 4, having a contact 4' at the head end thereof. The head of this binding-screw may be insulated from the metal portion of the burner-pillar by an insulating-washer 5, which in this case is separate from the bushing 3, and a similar washer, such as 6, may insulate a metal lock-nut 7 and a metal binding-screw or cap 8 from such burner-pillar. The contact 4' is in this case one of a pair which control one break in an electric circuit for signaling whether the gas issuing from the burner is lighted or unlighted, and the other contact is preferably carried by a circuit-controller responsive to the difference in temperature between a lighted and unlighted burner. Any device which may change its position or may change one of its physical or other characteristics in accordance with such variations in temperature may be associated with the burner to govern one point or break in an electric circuit; but I prefer to employ a thermostatic switch for this purpose, preferably a composite switch-bar made up of elements having different coefficients of expansion, the different elements or metals composing the switch-bar being preferably so placed as to cause the switch-bar to bend toward or away from the contact 4' to close or open an electric circuit at that point, according as the burner-pillar is cold or hot. Such a switch-bar is shown herein at $s$ and consists in this case of two strips, preferably metallic. The main strip is designated by 9 and in this case is made from metal having a greater coefficient of expansion than the strip 10, to which it is united. It being understood that both of these strips 9 and 10 are securely united or fastened together, the switch will bend away from the contact 4' when the burner-pillar is hot, and this will cause the metallic contact 12 to break the circuit between it and the contact 4', the circuit remaining open until the light is extinguished, when the burner will cool off and the switch will resume the position shown in Fig. 1, which is the position it occupies when the gas is not turned on and is also the position occupied by it when gas is escaping without being consumed. If the valve C is open, the cool gas escaping from the burner will reduce the temperature of the burner-pillar rapidly and the switch-bar will quickly make contact with the point 4', and this closing of the circuit at the burner will be indicated at some suitable point in a manner which will be hereinafter described. The switch $s$ may be secured to the burner-pillar in any suitable manner—as, for example, by screws 15—it being desirable to have metallic connection between the controlling thermostatic switch and the piping of the system.

The parts just described are sufficient for the purpose of indicating whether the burner is hot or cold—that is, whether the gas is lighted or unlighted; but they are not sufficient to indicate whether the gas is turned off or on when the burner is cold. For the purpose of accomplishing this result it is necessary to provide means for controlling an electric circuit at two different points, one of these points being controlled by an electrical device governed by the valve or cock by means of which the gas is turned off or on, while the other point in the circuit should be controlled by a device responsive to the difference in temperature between a lighted and an unlighted burner. Obviously one point or break in such a circuit may be controlled by an electric switch governed by the gas-controlling valve, while the other point or break in the circuit may be governed by a thermostatic controlling device responsive to differences in temperature. When an electric circuit is controlled conjointly by two such devices, it will be seen that it may be readily determined whether the gas is turned off or whether gas is escaping without being consumed, because the electrical conditions at two points in the circuit will have to be changed—that is, two breaks in a circuit will have to be closed in this case before the current flowing in the circuit will indicate the escape of unburned gas.

The device which operates in conjunction with the gas-controlling valve C is preferably a simple contact-arm or spring-contact 18, secured to and insulated from the piping, it being fastened in this case to a block 19 of insulating material secured to the valve-fitting by screws 20. The contact which coöperates with the contact-spring 18 is also preferably supported by the block 19, so as to be insulated from the piping, and is in this case a contact-pin 21. The break in the circuit, which is controlled by said spring and its contact-pin, is closed or open, according as the spring is operated by the valve C, and in this construction the valve-body carries a pin 22, which moves therewith and raises the spring 18 from the contact 21 when the valve is closed and permits said spring to engage said contact-pin 21 and close the circuit as soon as the operating-pin 22 withdraws from the spring 18 at the beginning of the opening movement of such valve. Two pins, as shown, may be used, if desired.

In Fig. 2 I have illustrated the manner in which a plurality of controlling devices may be connected in circuit to indicate selectively the condition of each gas-burner. Five burners (designated, respectively, by B, B', $B^2$, $B^3$, and $B^4$) are shown in this view connected in parallel branches 30, 31, 32, 33, and 34 of a main electrical controlling-circuit, the outgoing and return conductors of which are designated, respectively, by 35 and 36, both of these conductors being properly grounded and the former having therein a source of energy or battery $b$. Each of the pipes leading from the burners is also in metallic connection with the outgoing conductor 35, said pipes being connected thereto by conductors 40, 41, 42, 43, and 44. Each of the parallel branch conductors 30, &c., also contains in circuit therewith the coils of a relay, these relays being designated, respectively, by $r$, $r'$, $r^2$, $r^3$, and $r^4$, these relays controlling suitable indicators, which are preferably a series of lamps, such as $i$, $i'$, $i^2$, $i^3$, and $i^4$, connected in parallel between the mains $m$ and $m'$ of an incandescent-light circuit or signaling-circuit supplied with current from a source of energy or motor M. The switch-arm of each relay controls one of the branches of this signaling-circuit or light-circuit, and the indicators or lamps $i$ to $i^4$ will burn or remain dark, according as the gas issuing from the respective burners is unlighted or lighted. The binding-post or cap 8 (shown in Fig. 1) of each thermostatic controlling device is connected by a short conductor, such as 50, 51, 52, 53, or 54, to the corresponding contact 21 on the piping to which such burner is attached, and the conductors 30 to 34, inclusive, are connected to the respective switch-arms 18, the end of each conductor 30, &c., being coiled around one of the binding-screws 18'. It is obvious, however, that the conductors 30, &c., might be connected to the contact-pins and the conductors 50, &c., to the contact-springs.

Other types of indicating devices than the lamps $i$, &c., may be used either alone or in conjunction with the lamps, all of which indicating devices should be arranged at some suitable common point in order that the escape of unburned gas may be immediately indicated to an attendant when the signal-lamp burns or such other visible, audible, or other signaling device as may be employed is operated.

From the foregoing description, considered in connection with the drawings, it will be apparent that in my improved system of indicating the escape of unconsumed illuminating-gas all the signal-lamps will normally be dark (except for the moment or two after the lighting of each burner, when the corresponding lamp will glow for a few moments as the result of the closing of two breaks in its branch circuit) until the light at a burner is extinguished. If such light is extinguished in the ordinary manner—that is, by turning the cock and shutting off the flow of gas—one break in the branch circuit will be opened and the corresponding signaling device or lamp will remain dark. If, however, such light is extinguished by accident or design without turning off the flow of gas, the corresponding thermostatic controlling device will almost immediately cool off as a result of the cooling of the burner, due partly to the mere extinguishing of the light and partly to the efflux of unconsumed cool gas, and this controlling device will change the electrical condition of the branch circuit in this case by closing the second break in the circuit, and as the other break in such branch circuit is always closed when the gas-controlling valve is open the indicator corresponding to such burner will be immediately operated. In Fig. 2 the burner B' is unlighted and the valve is open, and hence both the breaks between the branch conductors 31 and 41 are closed by the thermostatic switch and the valve-controlled switch, thus permitting current to flow from the battery $b$ through the helix of the relay $r'$, which causes the switch-arm of said relay to close the branch signaling-circuit or light-circuit and the automatic turning on of the lamp $i''$. This indicator being properly designated to correspond to the location of the burner B', the point at which gas is escaping is immediately apparent and investigation may be made at once.

My improved thermostatic controlling device and system is simple and positive in operation and requires no delicate adjustment of its parts to operate properly, the principal controlling element being preferably contained within and protected by the burner and being immediately responsive to the cooling or heating of said burner. Moreover, this main controlling element is unchanged by repeated heating and cooling and is strong and very durable, in all of which respects it differs from all other types of gas-detecting devices with which I am familiar.

What I claim is—

The combination with a system of gas-lighting embodying a plurality of gas-burners each having a valve controlling the flow of gas therefrom, of an electrical controlling-circuit having parallel branches each of which has two breaks, valve-operated electric switches controlling one set of breaks in said branch circuits, thermostatic circuit-controllers carried by said burners and governing the other set of breaks in said branch circuits, relays governed respectively by said parallel branches of the controlling-circuit and each embodying an electromagnet and a switch-bar secured to the armature of said electromagnet, and an electric-lighting system comprising an incandescent-light circuit having a plurality of lamps connected in normally open branch circuits corresponding in number to said burners and controlled respectively by the switch-bars of said relays.

Signed at New York, in the county of New York and State of New York, this 4th day of September, A. D. 1902.

JAMES EDWARD BALDWIN.

Witnesses:
C. S. CHAMPION,
EDGAR A. FELLOWS.